US010953919B2

(12) United States Patent
Andreas et al.

(10) Patent No.: US 10,953,919 B2
(45) Date of Patent: Mar. 23, 2021

(54) STEERING ANGLE SENSOR WITH SLOTTED MAGNET

(71) Applicant: Bourns, Inc., Riverside, CA (US)

(72) Inventors: Sommer Andreas, Prien (DE); Johann Jahrstorfer, Munich (DE); Miguel Cano, Munich (DE); Benno Pichler, Aying (DE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 16/262,641

(22) Filed: Jan. 30, 2019

(65) Prior Publication Data

US 2019/0233008 A1 Aug. 1, 2019

(30) Foreign Application Priority Data

Jan. 31, 2018 (DE) .................... 10 2018 102 184.4

(51) Int. Cl.
*B62D 15/00* (2006.01)
*B62D 15/02* (2006.01)
*G01D 5/12* (2006.01)
*G01D 5/14* (2006.01)

(52) U.S. Cl.
CPC .......... *B62D 15/0215* (2013.01); *G01D 5/12* (2013.01); *G01D 5/145* (2013.01)

(58) Field of Classification Search
CPC ....... B62D 15/0215; G01D 5/12; G01D 5/145
USPC ........................................................ 280/93.5
See application file for complete search history.

(56) References Cited

U.S. PATENT DOCUMENTS

2014/0131132 A1* 5/2014 Pesch .................. B62D 5/0409 180/444
2016/0265940 A1* 9/2016 Burgdorf ................ G01D 5/16
2017/0082457 A1* 3/2017 Narasimhan ............ G01B 7/30

FOREIGN PATENT DOCUMENTS

DE 19703903 A1 8/1998
DE 102005007307 A1 8/2006
DE 102011080789 A1 2/2012
EP 0856720 A1 * 8/1998 ............ G01D 5/145

OTHER PUBLICATIONS

Translation of EP 0856720 accessed at www.espacenet.com on Jun. 19, 2020. (Year: 1998).*

* cited by examiner

*Primary Examiner* — James A Shriver, II
*Assistant Examiner* — Hilary L Johns
(74) *Attorney, Agent, or Firm* — Michael Best & Friedrich LLP

(57) ABSTRACT

Embodiments relate to a vehicle including a chassis that is moveable in a driving direction, two rear wheels moveably carrying the chassis on the rear side seen in the driving direction, two front wheels moveably carrying the chassis on the front side seen in the driving direction, a steering wheel for turning a steering column around a rotation axis for steering the front wheels, and a steering angle sensor for measuring a rotation angle of the steering column around the rotation axis with an encoder that is stationary to the steering column and with a magnet sensor that is disposed axially displaced distance from the encoder on the rotation axis.

18 Claims, 2 Drawing Sheets

2 3 4 5 6 10 24 24 22 12 11 11 12 13 13 9 20 8 7 13 18 13 11 12 11 12 14 16 24 24 6 5 10

STEERING ANGLE SENSOR WITH SLOTTED MAGNET

FIELD

Embodiments relate to steering angle sensors and vehicle that use steering angle sensors.

SUMMARY

Vehicles may be known from document DE 197 03 903 A1.

One object of the invention to improve the known vehicle.

According to an aspect, a vehicle includes a chassis that is moveable in a driving direction, two rear wheels moveably carrying the chassis on the rear side seen in the driving direction, two front wheels moveably carrying the chassis on the front side seen in the driving direction, a steering wheel for turning a steering column around a rotation axis for steering the front wheels, and a steering angle sensor for measuring a rotation angle of the steering column around the rotation axis with an encoder that is stationary to the steering column, and with a magnet sensor that is disposed axially displaced from the encoder on the rotation axis. The encoder includes a first magnet with a top side directed to the magnet sensor and a second magnet attached to the first magnet opposite to the top side, wherein the first magnet includes a recess starting from the top side and extending at least until the second magnet, wherein each magnet is magnetized orthogonal to the rotation axis, and wherein regarding from the magnetizations, the first magnet slice and the second magnet slice are displaced against each other in rotation direction.

In a development of the provided vehicle, the magnets of the encoder have a circular shape.

In a further development of the vehicle, the recess is a slot.

In another development of the provided vehicle, the slot has two longitudinal ends each formed as an arc.

In a yet another development of the provided vehicle, the arcs are formed in parallel to a circumference of the encoder.

In a preferred development of the provided vehicle, the encoder has a thickness in direction of the rotation axis having a size between 90% and 110%, preferably between 95% and 105%, most preferably between 99% and 101% of an extension between the arcs and the circumference of the encoder.

In an additional development of the provided vehicle, the slot has an extension in transversal direction that is between 70% and 85%, preferably between 75% and 80%, most preferably between 76% and 78% of an extension in longitudinal direction.

In a further additional development of the provided vehicle, the slot is arranged perpendicular to the magnetization of the magnets.

In another development of the provided vehicle, the sensor is placed in a distance from the encoder that is smaller than a minimum extension of the recess perpendicular to the rotation axis.

In a yet another development of the provided vehicle, a maximum extension of the magnetic sensor perpendicular to the rotation axis is lower than a minimum extension of the recess perpendicular to the rotation axis.

In an additional development of the provided vehicle, the recess is a through hole through the encoder.

According to another aspect, a steering angle sensor for measuring a rotation angle of the steering column around the rotation axis includes an encoder and a magnet sensor. The encoder that is stationary to the steering column. The magnet sensor is axially displaced from the encoder on the rotation axis. The encoder includes a first magnet with a top side directed to the magnet sensor and a second magnet attached to the first magnet opposite to the top side, wherein the first magnet includes a recess starting from the top side and extending at least until the second magnet, wherein each magnet is magnetized orthogonal to the rotation axis, and wherein regarding from the magnetizations, the first magnet slice and the second magnet slice are displaced against each other in rotation direction.

The above described characteristics, features and advantages of this invention as well as the manner and way how they are achieved will be better understood based on following description of the embodiments that will be explained in further detail in connection with the figures.

DETAILED DESCRIPTION

In the figures, equal technical elements will be provided with equal reference signs and described only one time. The figures are only of schematic nature and do in particular not disclose any real geometric dimension.

Figure 1:
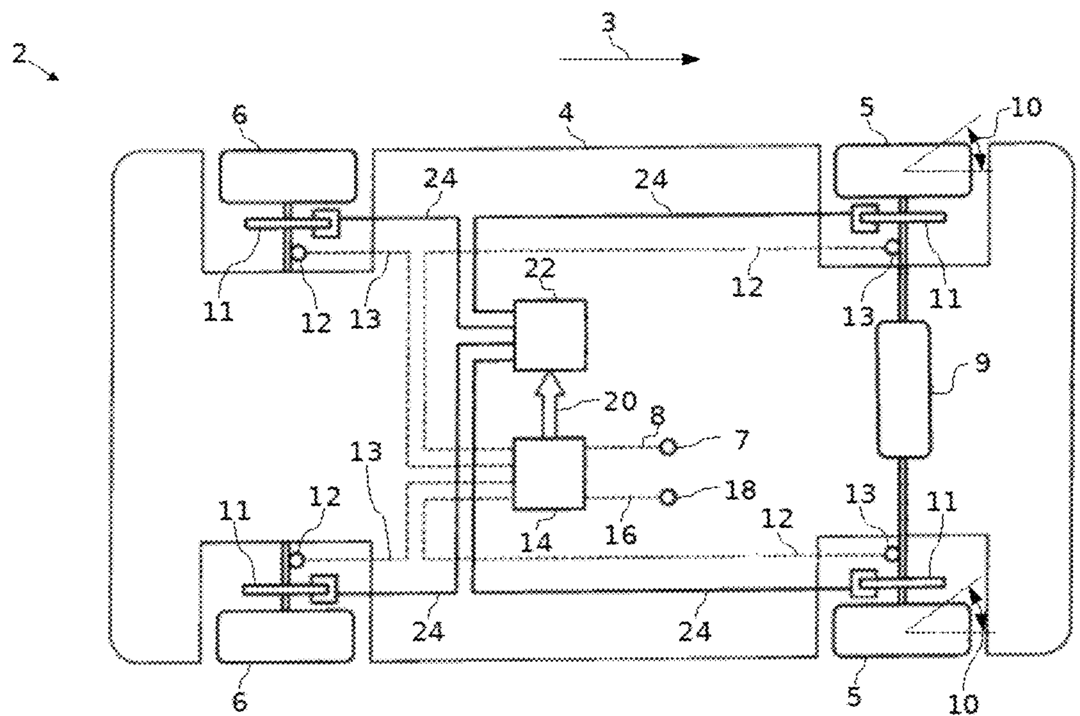
FIG. 1 a principle schematic of a car with a driving dynamic control.

Reference is made to FIG. 1 that shows a schematic view of a vehicle 2 with a known driving dynamic control. Details to this driving dynamic control can be taken from DE 10 2011 080 789 A1.

The vehicle 2 is movable in a driving direction 3 and comprises a chassis 4 that is in the driving direction 3 movably carried on two front wheels 5 and two rear wheels 6. Each wheel 5, 6 can be slowed down via a brake 8 that is stationary fixed at the chassis 4 to slow down the movement of the vehicle on a street that is not shown in the figures.

The driving direction 3 during the movement of the vehicle 2 can be controlled by a driver of the vehicle 2 by positioning a steering wheel 7 that is symbolically indicated in FIG. 1 into a steering angle 8. The steering wheel 7 itself controls based on the steering angle 8 a steering gear 9 that adjusts a wheel angle 10 of the front wheels 5 based on the steering angle 8. Based on the variation of the steering angle 8 in time, the vehicle 2 runs a trajectory on the street that is defined by the driver of the vehicle.

During the movement of the vehicle 2 it may occur in a manner that is basically known to the skilled person in the art that the wheels 5, 6 lose their contact to the street and deviates from the trajectory defined by the driver. To prevent such a behavior, the vehicle 2 is provided with the before mentioned vehicle dynamic control.

The vehicle dynamic control includes a brake 11 and wheel speed sensor 12 at each wheel 5, 6. The wheel speed sensor 12 measures the wheel speed 13 of each wheel and provides it to a controller 14. The controller 14 further receives inertial data 16 like a gear rate of the vehicle 2 from an inertial sensor 18 and calculates based on these data the measured driving direction. Then, the controller 14 determines whether the measured driving direction corresponds to the steering angle 8 defined by the driver. In case of any deviations, the controller 14 outputs a control signal 20 to an actuator 22 that individually controls the brakes 11 with suitable actuator signals 24 to correct the driving direction 3 of the vehicle.

Figure 2:
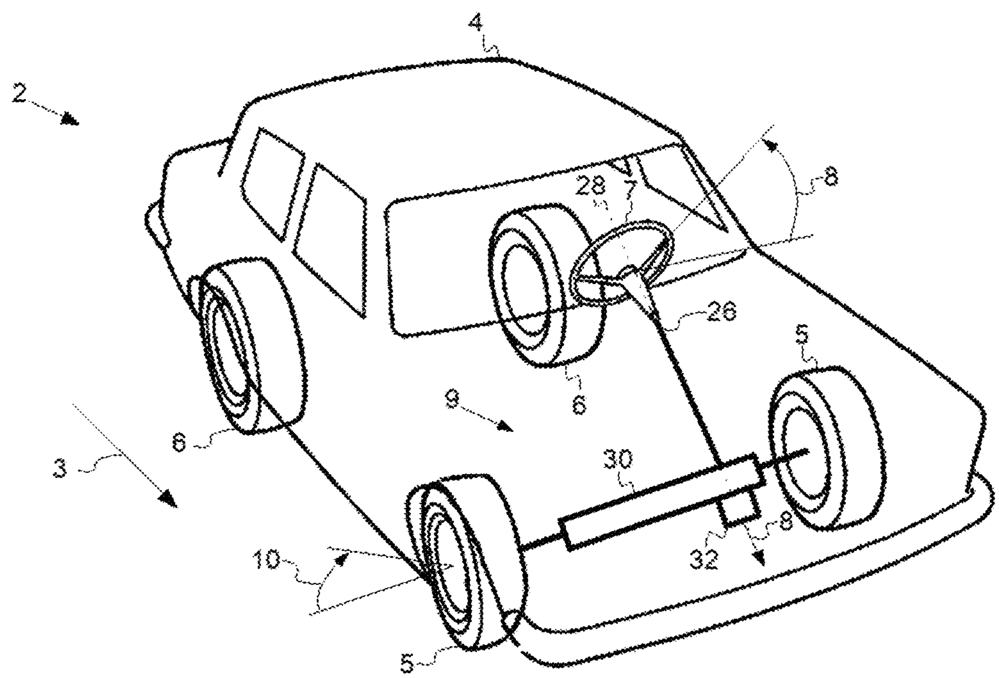
FIG. 2 a principle schematic of the car of FIG. 1 in a perspective view, FIG. 3, a principle schematic of a steering angle sensor in the car of FIG. 1 and FIG. 2 in a perspective view, FIG. 4*a* the steering angle sensor of FIG. 3 in a sectional view, and FIG. 4*b* the steering angle sensor of FIG. 3 in a bottom view.

Reference is taken to FIG. 2 to roughly explain the steering mechanism in the vehicle 2. To not unnecessarily complicate the following explanations, a lot of technical elements as e.g. active steering elements or the like are omitted. Details for understanding a steering mechanism can be taken e.g. from DE 10 2005 007 307 A1.

When the driver positions the steering wheel 7 in the steering angle 8, the steering wheel 7 turns a steering column 26 around a rotation axis 28 that itself moves a steering rod 30 for turning the front wheels. That is, the rotation angle of the steering column 26 around the rotation axis 28 corresponds to the steering angle 8, such that when the rotation angle of the steering column 26 is measured, the steering angle 8 of the steering wheel 7 is known.

In the present embodiment, there is a steering angle sensor 32 attached to the axial end of the steering column 26 opposite to the steering wheel 28. This steering angle sensor 32 measures the rotation angle of the steering column 26 and therewith the steering angle 8.

Figure 3:
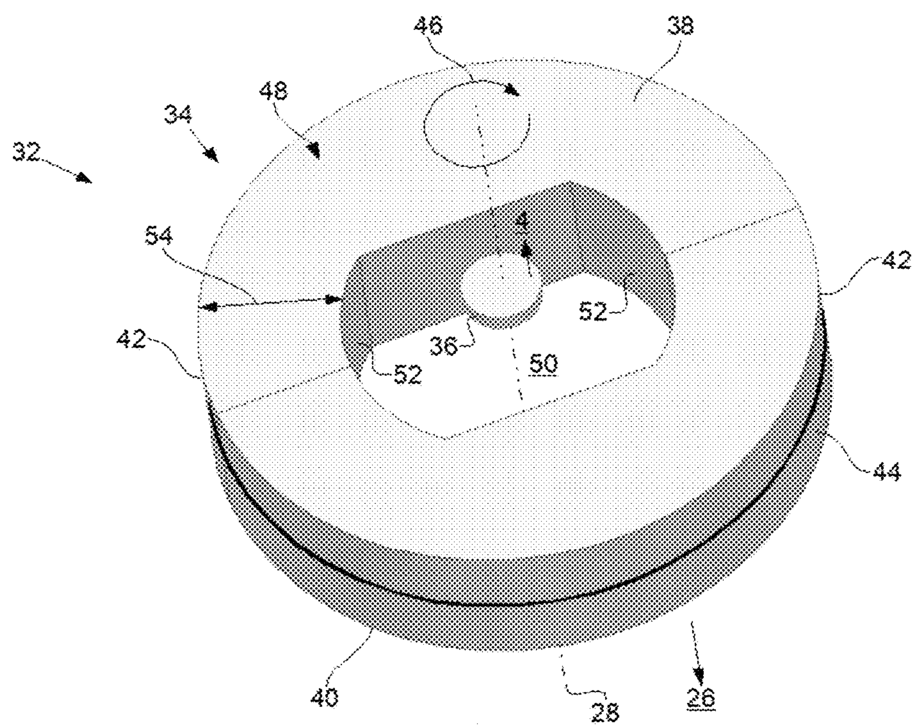
Figure 4A:
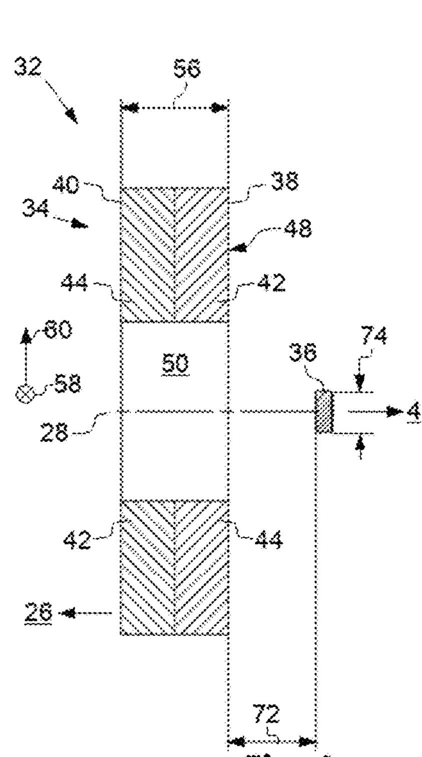
Figure 4B:
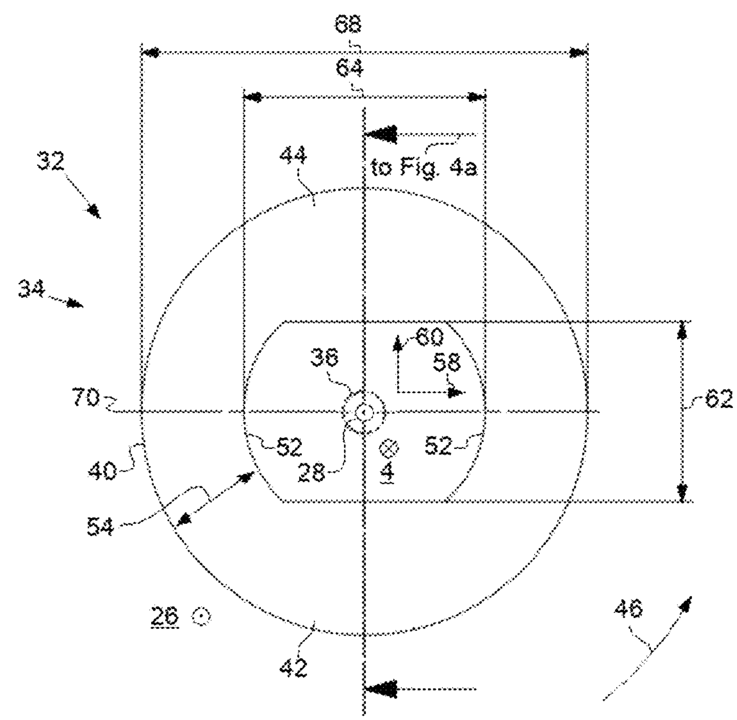

Based on FIGS. 3 to 4*b*, this steering angle sensor 32 should be described in further detail.

The steering angle sensor 32 comprises an encoder 34 that is stationary to the steering column 26 and a magnet sensor 36 that is stationary to the chassis 4 of the vehicle 2. The fixation of these components within the vehicle 2 is indicated by arrows in FIGS. 3 to 4*b*.

The encoder 36 is comprises a first magnet 38 and a second magnet 40. Both magnets 38, 40 are formed as a circular disc that is magnetized in a direction perpendicular to the rotation axis, such that one disc half of each magnet 38, 40 is the north pole 42 and the other disc half of each magnet 38, 40 is the south pole 44. Both magnets 38, 40 are stacked on each other and aligned to the rotation axis 28. Therein, the north pole 42 of one magnet 38, 40 is placed on the south pole 44 of the other magnet 40, 38 and vice versa, such that both magnets 38, 40 are displaced in a rotation direction 46 around the rotation axis 28.

The description of the encoder 32 as composed based on two separated magnets 38, 40 is only figurative to comprehensively explain the construction of the encoder 32. The encoder 32 can also be a single magnetizable piece, wherein the north and south poles 42, 44 are introduced with a suitable magnetization method.

The first magnet 38 has a top surface 48 that is directed to the magnet sensor 36. The top surface 48 of the first magnet 38 is not visible in the perspective of FIG. 4*b*. The second magnet 40 is attached to the first magnet 38 opposite to the top surface 48.

Seen from the rotation axis 28, a through hole 50 is formed through at least the first magnet 38 of the encoder 32. This through hole 50 is formed as through hole 50 through the complete encoder 32 in the present embodiment.

The through hole 50 is formed as a slot in the present embodiment, which has two longitudinal ends 52 that are formed as arcs. Therein, the arc formed longitudinal ends 52 run in parallel to a circumference of the encoder 32, such that an arc distance 54 of the arcs from the circumference of the encoder 32 keeps constant in this area. The encoder 32 has a thickness 56 in direction of the rotation axis 28 having a size between 90% and 110%, preferably between 95% and 105%, most preferably between 99% and 101% of an extension of the arc distance 54.

The slot shaped through hole 50 extends in a longitudinal direction 58, in which the longitudinal ends 52 oppose each other. The slot shaped through hole 50 further extents in a traversal direction 60 that runs perpendicular to the longitudinal direction 58 and perpendicular to the rotation axis 28. In the transversal direction 60, the slotted shaped through hole 50 has a traverse extension 62 that is between 70% and 85%, preferably between 75% and 80%, most preferably between 76% and 78% of a longitudinal extension 64 in the longitudinal direction 58. Therein the longitudinal extension 64 can be chosen larger than a diameter 68 of the encoder 32 perpendicular to the rotation axis.

The slot shaped through hole 50 is placed perpendicular to the magnetization of the magnets 38, 40. That is, the slot shaped through hole 50 is placed along a separation line 70 that separates the north pole 42 from the south pole 44.

The sensor 36 is placed in an axial distance 72 from the encoder 32. This axial distance 72 is smaller than a minimum extension of the slot shaped through hole 50 perpendicular to the rotation axis 28. In the present embodiment, this minimum extension is the transversal extension 62.

Finally, the magnetic sensor 36 has a maximum magnetic sensor extension. As the magnetic sensor 36 is circular shaped in the present embodiment, the maximum magnetic sensor extension is the sensor diameter 74. This sensor diameter is smaller than the minimum extension of the slot shaped through hole 50 perpendicular to the rotation axis 28, i.e. the transversal extension 62 in the present embodiment.

The invention claimed is:

1. A vehicle comprising:

a chassis that is moveable in a driving direction and having a front side and a rear side;

two rear wheels moveably carrying the chassis on the rear side;

two front wheels moveably carrying the chassis on the front side;

a steering wheel for turning a steering column around a rotation axis for steering the front wheels; and a steering angle sensor for measuring a rotation angle of the steering column around the rotation axis with an encoder that is stationary to the steering column and with a magnet sensor that is disposed axially displaced from the encoder on the rotation axis;

wherein the encoder includes a first magnet with a top side directed to the magnet sensor, characterized in that the encoder includes a second magnet attached to the first magnet opposite to the top side, wherein the first magnet includes a recess starting from the top side and extending at least until the second magnet, wherein each magnet is magnetized orthogonal to the rotation axis, and wherein regarding from the magnetizations, the first magnet and the second magnet are displaced against each other in rotation direction, wherein the sensor is placed in a distance from the encoder that is smaller than a minimum extension of the recess perpendicular to the rotation axis.

2. The vehicle according to claim 1, wherein the magnets of the encoder have a circular shape.

3. The vehicle according to claim 1, wherein the recess is a slot.

4. The vehicle according to claim 3, wherein the slot has two longitudinal ends each formed as an arc.

5. The vehicle according to claim 4, wherein the arcs are formed in parallel to a circumference of the encoder.

6. The vehicle according to claim 5, wherein the encoder has a thickness in direction of the rotation axis having a size between 90% and 110% of an extension between the arc shaped longitudinal ends and the circumference of the encoder.

7. The vehicle according to claim 3, wherein the slot has an extension in transversal direction that is between 70% and 85% of an extension in longitudinal direction.

8. The vehicle according to claim 3, wherein the slot is arranged perpendicular to the magnetization of the magnets.

9. The vehicle according to claim 1, wherein a maximum extension of the magnetic sensor perpendicular to the rotation axis is lower than a minimum extension of the recess perpendicular to the rotation axis.

10. A steering angle sensor for measuring a rotation angle of a steering column around the rotation axis, the steering angle sensor comprising:

an encoder that is stationary to the steering column; and a magnet sensor that is disposed axially displaced from the encoder on the rotation axis;

wherein the encoder includes a first magnet with a top side directed to the magnet sensor, characterized in that the encoder includes a second magnet attached to the first magnet opposite to the top side, wherein the first magnet includes a recess starting from the top side and extending at least until the second magnet, wherein each magnet is magnetized orthogonal to the rotation axis, and wherein regarding from the magnetizations, the first magnet and the second magnet are displaced against each other in rotation direction, wherein the sensor is placed in a distance from the encoder that is smaller than a minimum extension of the recess perpendicular to the rotation axis.

11. The steering angle sensor according to claim 10, wherein the magnets of the encoder have a circular shape.

12. The steering angle sensor according to claim 10, wherein the recess is a slot.

13. The steering angle sensor according to claim 12, wherein the slot has two longitudinal ends each formed as an arc.

14. The steering angle sensor according to claim 13, wherein the arcs are formed in parallel to a circumference of the encoder.

15. The steering angle sensor according to claim 14, wherein the encoder has a thickness in direction of the rotation axis having a size between 90% and 110% of an extension between the arc shaped longitudinal ends and the circumference of the encoder.

16. The steering angle sensor according to claim 12, wherein the slot has an extension in transversal direction that is between 70% and 85% of an extension in longitudinal direction.

17. The steering angle sensor according to claim 12, wherein the slot is arranged perpendicular to the magnetization of the magnets.

18. The steering angle sensor according to claim 10, wherein a maximum extension of the magnetic sensor perpendicular to the rotation axis is lower than a minimum extension of the recess perpendicular to the rotation axis.

* * * * *